United States Patent
Mönch et al.

(10) Patent No.: US 7,327,096 B2
(45) Date of Patent: Feb. 5, 2008

(54) ELECTRODE TEMPERATURE DIFFERENTIAL OPERATION OF A DISCHARGE LAMP

(75) Inventors: Holger Mönch, Vaals (NL); Xaver Riederer, Aachen (DE); Carsten Deppe, Aachen (DE); Peter Lürkens, Aachen (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 142 days.

(21) Appl. No.: 10/518,258

(22) PCT Filed: Jun. 16, 2003

(86) PCT No.: PCT/IB03/02764

§ 371 (c)(1), (2), (4) Date: Aug. 31, 2005

(87) PCT Pub. No.: WO04/002200

PCT Pub. Date: Dec. 31, 2003

(65) Prior Publication Data

US 2006/0012309 A1   Jan. 19, 2006

(30) Foreign Application Priority Data

Jun. 25, 2002   (EP) .................... 02014172

(51) Int. Cl.
*H05B 37/02* (2006.01)

(52) U.S. Cl. ............... 315/291; 315/308; 315/DIG. 5; 315/DIG. 7

(58) Field of Classification Search ........... 315/246, 315/247, 291, 307, 308, 309, DIG. 5, DIG. 7
See application file for complete search history.

(56) References Cited

U.S. PATENT DOCUMENTS

| | | | | |
|---|---|---|---|---|
| 3,949,267 A | * | 4/1976 | Collins | 315/203 |
| 4,132,925 A | * | 1/1979 | Schmutzer et al. | 315/208 |
| 4,198,663 A | * | 4/1980 | Sugihara | 360/40 |
| 5,001,386 A | * | 3/1991 | Sullivan et al. | 315/219 |
| 5,047,695 A | * | 9/1991 | Allen et al. | 315/291 |
| 5,198,727 A | * | 3/1993 | Allen et al. | 315/291 |
| 5,608,294 A | * | 3/1997 | Derra et al. | 315/224 |
| 6,232,725 B1 | | 5/2001 | Derra et al. | 315/209 R |

FOREIGN PATENT DOCUMENTS

JP   2000-357594   * 12/2000

* cited by examiner

*Primary Examiner*—Thuy Vinh Tran

(57) ABSTRACT

The invention relates to a method for operating a discharge lamp 11 including two electrodes 12,13. The method comprises applying to the electrodes an alternating current $I_{Lamp}$. In order to improve the performance of the lamp and to increase the life time of the lamp, it is proposed that the alternating current has a direct current component DC for compensating a temperature difference between the two electrodes. The direct current component is selected more specifically such that a first electrode, which is expected to have a lower temperature than the second electrode, functions as anode for the direct current component, while the second electrode functions as cathode for the direct current component. The invention relates equally to an electronic circuit and to a software program for operating a discharge lamp correspondingly, as well as to a lighting system comprising a discharge lamp and means for operating this discharge lamp correspondingly.

22 Claims, 4 Drawing Sheets

ELECTRODE TEMPERATURE DIFFERENTIAL OPERATION OF A DISCHARGE LAMP

This application is the U.S. national stage filing of international application No. PCT/IB2003/02764, filed Jun. 16, 2003, which has the benefit of EP Provisional No. 02014172.7, filed Jun. 25, 2002.

The invention relates to a method for operating a discharge lamp including two electrodes, the method comprising applying to the electrodes an alternating current (AC). The invention relates equally to an electronic circuit for operating a discharge lamp, to a software program supporting the operation of a discharge lamp, and to a lighting system comprising such a discharge lamp.

High Intensity Discharge lamps are known from the state of the art. Such discharge lamps comprise a tube containing an inert gas or vapor. Further, two electrodes protrude into the tube. For operating the lamp, a suitable alternating current is supplied to these electrodes such that an arc is established and maintained between them.

One special type of high intensity discharge lamps is the Ultra High Performance (UHP) lamp, which may employ e.g. mercury vapor and tungsten electrodes. A common electrode construction in UHP lamps consists of a tungsten rod on which a tungsten coil is positioned. UHP lamps are used for example for projection applications, in which the optical demands on the display require arc lengths in the order of 1 mm. The electrodes in UHP lamps reach temperatures close to or even above the melting point of pure tungsten. These temperatures are required to allow thermal emission of electrons in case of a highly contracted high pressure mercury arc and to avoid e.g. arc jumping. If the electrodes become too hot, however, a so called "burning back" of the electrodes occurs. As a result, the gap between the electrodes is increased, reducing the performance in optical systems. Such a "burning back" is a common reason for poor lamp maintenance. Therefore, a careful design and operation of UHP lamps are necessary, in order to guarantee a well defined electrode temperature. The same requirement may equally be given for other kinds of discharge lamps.

A problem in providing the optimal temperature for the two electrodes of a discharge lamp may arise in particular, in case the two electrodes reach different temperatures. Such a situation may also occur if two similar electrodes are employed, since these electrodes may be used asymmetrically. As a consequence, one electrode may still work under its design conditions in a proper way, while the other electrode suffers either from arc jumping since it is too cold, or from "burning back" since it is too hot.

There is a variety of factors which may lead to an asymmetry between two electrodes of a discharge lamp.

Firstly, a discharge lamp is usually employed in a reflector, which reflector may act as a cooling fin for the lamp. Depending on the mounting of the lamp in the reflector, one end of the lamp, and thus one electrode, may be cooled more than the other end with the other electrode.

Further, an increasing amount of UHP lamps is operated with a forced air cooling. This cooling is usually directed to the front end of the lamp or to the upper side of the lamp. Depending on the details of this airflow, highly different electrode temperatures can be observed.

Current UHP lamps are moreover designed to be operated in a horizontal burning position. Some applications, however, use the lamp in a tilted or even vertical position. As a result, the two electrodes receive a different heat load by the convective upwards flow of hot gas, and therefore they reach different temperatures.

During the lifetime of a discharge lamp, also the structure of the electrodes may change due to mechanical movements of parts of the electrodes, e.g. of the coil on the rod. Even in new lamps, the structure of the electrodes may vary due to tolerances. In case one of the electrodes already started to "burn back", its abilities to conduct and to emit heat change, and the process may speed up leading to an early lamp failure.

Most of these asymmetries cannot be compensated by using different electrodes, because they are unpredictable. Different electrodes further prevent a general use of the lamps and require additional care when inserting the lamp into the system in which it is employed.

It is an object of the invention to increase the performance and the lifetime of discharge lamps. It is in particular an object of the invention to provide a possibility of maintaining a temperature balance between two electrodes of a discharge lamp.

These objects are reached according to the invention with a method for operating a discharge lamp including two electrodes, which method comprises applying to the electrodes an alternating current. It is proposed that this alternating current has a direct current component for compensating a temperature difference between the two electrodes. The direct current component is selected to this end such that a first one of the electrodes, which is expected to have a lower temperature than the second one of the electrodes, functions as anode for the direct current component, while the second electrode functions as cathode for the direct current component.

The objects of the invention are equally reached with an electronic circuit employed for operating a discharge lamp with two electrodes, which electronic circuit comprises means for realizing the proposed method. Further, the objects of the invention are reached with a software program for operating a discharge lamp with two electrodes, which software program comprises a software code realizing the proposed method when run in processing means of a driver controlling the power supply to the discharge lamp. Finally, the objects of the invention are reached with a lighting system, for instance a projection system, which comprises a discharge lamp with two electrodes and means for operating this discharge lamp according to the proposed method.

The two electrodes of the discharge lamp that is to be operated can be in particular, though not necessarily, similar electrodes.

The invention proceeds from the recognition that an electrode is heated more if it acts like an anode and is heated less if it acts like a cathode. Therefore, it is proposed to operate a discharge lamp with an alternating current which has a direct current component, the direct current component being used for balancing the temperature of the two electrodes.

It is an advantage of the invention that it allows to operate a discharge lamp such that both electrodes will run at the same temperature, which enables the setting of an optimum temperature for both electrodes. Thereby, arc jumping and a "burning back" of the electrodes can be avoided. As a result, the performance of a gas discharge lamp will be improved and its lifetime be increased for the case that the lamp operated in an asymmetric manner.

Preferred embodiments of the invention become apparent from the dependent claims.

The desired DC component of the alternating current applied to the electrodes of the discharge lamp can be achieved in several ways.

In a first preferred embodiment of the invention, the DC component is obtained by superimposing a DC current to the standard AC lamp current.

In a second preferred embodiment of the invention, the DC component is obtained by using a different strength of the AC current for the two current directions.

In a third preferred embodiment of the invention, the DC component is obtained by changing the time during which the lamp is operated in the two current directions. While in a standard AC operation, the waveform of the alternating current has a duty cycle with two half cycles of equal length for the two current directions, the proposed adjustment thus results in an operation with a duty cycle deviating from the standard 50:50 situation.

In a fourth preferred embodiment of the invention, the DC component is obtained by adapting the energy content of one or more additional pulses employed in each half cycle of the alternating current in a way that the energy content of these additional pulses is larger in one current direction than in the other. The energy content of such additional pulses can be adapted in particular by adapting the amplitude and/or the time of the additional current pulse or pulses individually for each half-cycle.

The amount of the DC component employed for balancing the temperature lies preferably in the range of 0.1% to 50% of the total current amount.

The expected temperature situation can equally be determined in different ways.

In case the asymmetrical heating of the electrodes is expected to be basically constant during the life time of the lamp, e.g. due to a predetermined orientation of the lamp or due to the arrangement of means producing a cooling air flow, it might be sufficient to predetermine the required amount of the DC component with some sample lamps. This amount can then be set as a fixed DC component for the lamp power supply.

In case the asymmetrical heating of the electrodes is not constant during the life time of the lamp, e.g. due to changing operating conditions or due to a changing electrode structure, the temperature situation of the electrodes is advantageously supervised individually for each lamp during its entire lifetime. The required amount of the DC component can then be determined continuously or repeatedly based on the respective temperature situation.

For determining the temperature situation in a rather simple way, the lamp burning voltage can be measured by the driver of the lamp at several times, i.e. at least twice, during one half cycle of the alternating current supplied to the lamp. If the measured voltage is slightly increasing during one half cycle, the electrode acting as a cathode in this half cycle can be assumed to be hot enough. If the voltage is decreasing or shows a sudden drop during one half cycle, in contrast, the electrode acting as a cathode in this half cycle can be assumed to be too cold. As only the respective cathode causes these voltage changes, both electrodes can be observed independently when taking into account the alternating current direction. A corresponding detection of electrodes that have to be considered to be too cold has also been described in document U.S. Pat. No. 6,232,725.

The method according to the invention can further be integrated into a control loop controlling the current supply to the lamp and adjusting the DC component continuously.

Moreover, information about the adjusted DC component can be stored in a non volatile memory, e.g. only the last applied value or more extensive information like the entire lamp history. The information can comprise for example the value of the respectively employed DC component, determined temperatures or temperature differences, or determined lamp voltages. The stored information can then be used for future predictions of the required amount of the DC component.

In order to operate both electrodes always at an optimum temperature, in addition an adjustment of the average lamp power should be enabled, e.g. for the case that both electrodes are too cold or hot enough. This aspect may also be included in a provided control loop. Thereby, an arc jumping at both electrodes and a "burning back" of both electrodes in case of a balanced but non-optimum temperature can be avoided.

The operated discharge lamp can be in particular a UHP lamp, but equally any other discharge lamp.

The method according to the invention can be implemented in an electronic circuit employed for operating the discharge lamp.

The method according to the invention can be realized in particular by software, which may be implemented e.g. in a micro-controller controlling the driver of the discharge lamp.

Other objects and features of the present invention will become apparent from the following detailed description of selected embodiments of the invention considered in conjunction with the accompanying drawings, wherein FIG. 1 shows a block diagram of a part of an embodiment of a projection system according to the invention;

Figure 1:
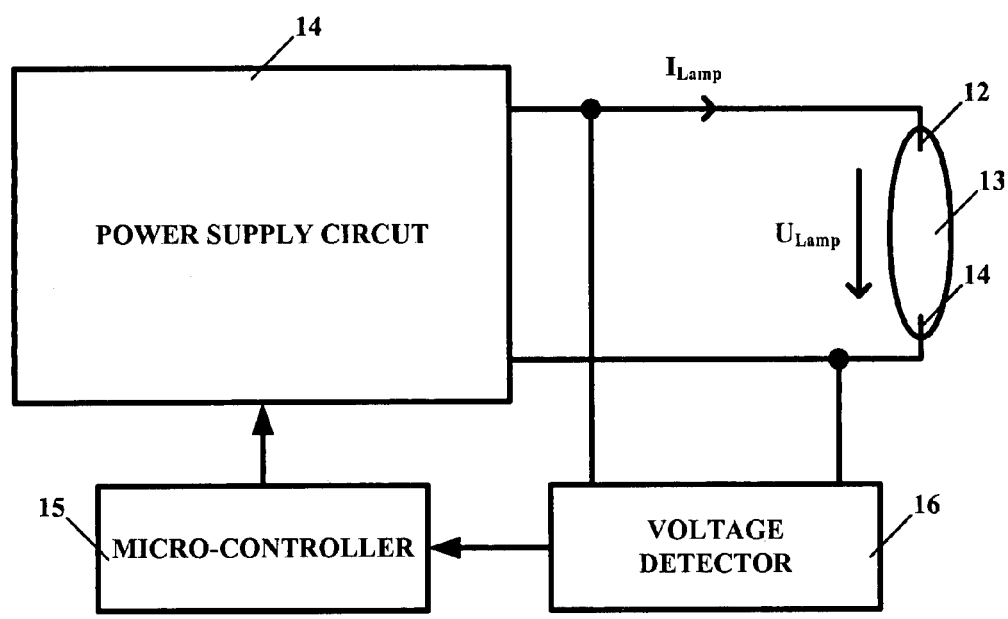
FIG. 1 shows in form of a block diagram components of a of projection system in which an embodiment of the method according to the invention may be implemented.

The projection system comprises a UHP lamp 11 which is to be operated according to the invention. Two electrodes 12, 13 of the UHP lamp 11 are connected to this end to a controllable power supply circuit 14. The power supply circuit 14 may comprise in particular a power supply unit providing a direct current of a controllable value, and a controllable inverter transforming the provided direct current into an alternating current $I_{Lamp}$ desired for operating the lamp 11.

The power supply circuit 14 is controlled by a micro-controller 15. The micro-controller 15 comprises a software, which is able to control the power supply circuit 14 in a conventional manner. That is, the software causes the power supply circuit 14 to supply an alternating current $I_{Lamp}$ to the UHP lamp 11 which is suited to establish and maintain an arc between the two electrodes 12, 13. The software is in addition able to adjust the conventionally supplied alternating current to comprise a desired direct current component.

The micro-controller 15 further comprises a non-volatile memory. In this memory, the history of the provided direct current components is stored. The micro-controller 15 receives as input information on the current lamp voltage via a voltage detector 16 detecting the respective voltage $U_{Lamp}$ over the UHP lamp 11. Power supply circuit 14, micro-controller 15 and voltage detector 16 constitute together the driver of the UHP lamp 11.

The software of the micro-controller adjusts the direct current component of the current $I_{Lamp}$ supplied by the power supply circuit 14 in a control loop. In this control loop, the software first evaluates information on the lamp voltage received by the voltage detector 16. The lamp burning voltage $U_{Lamp}$ is measured by the voltage detector 16 repeatedly during each half cycle of the alternating current supplied to the lamp 11. If this voltage $U_{Lamp}$ is determined by the software to be increasing during one half cycle, the electrode 12, 13 acting in this half cycle as a cathode is hot enough. If the voltage is determined by the software to be decreasing or to show a sudden drop during one half cycle, the electrode 12, 13 acting in this half cycle as a cathode is too cold.

Based on this evaluation, the software then adjusts its conventional control of the power supply circuit 14 and thus of the conventionally supplied alternating current. That is, in case it is determined that one electrode 12, 13 is too cold, the direct current component is increased in a sense that this electrode 12, 13 acts more as an anode than before. In case it is determined that both electrodes 12, 13 are hot enough, in contrast, the direct current component is lowered in order to approach a pure alternating current operation. Further below, four different solutions for adjusting the conventional alternating current to comprise a direct current component will be presented with reference to FIGS. 2 to 7.

In addition, the entire average lamp power is increased in the control loop, in case it is determined that both electrodes 12, 13 are too cold. In case it is determined that both electrodes 12, 13 are hot enough, while it can be concluded from the lamp history stored in the memory of the micro-controller 15 that both electrodes do not tend to approach the critical temperature boundary, the average lamp power is lowered.

Thus, the presented system allows to operate both electrodes 12, 13 of the UHP lamp 11 always at an optimum temperature.

FIGS. 2 to 7 are diagrams depicting different lamp currents $I_{Lamp}$ over time t.

Figure 2:
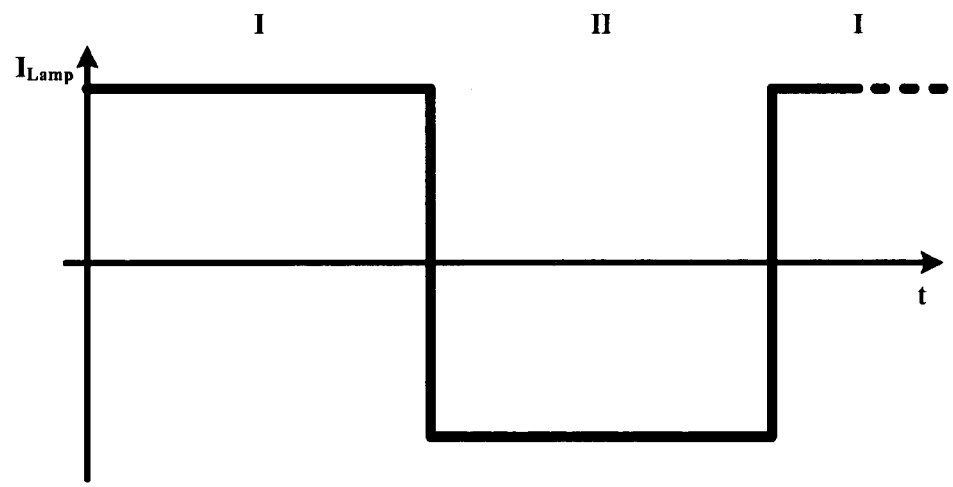
FIG. 2 shows an alternating block current without a direct current component.
Figure 3:
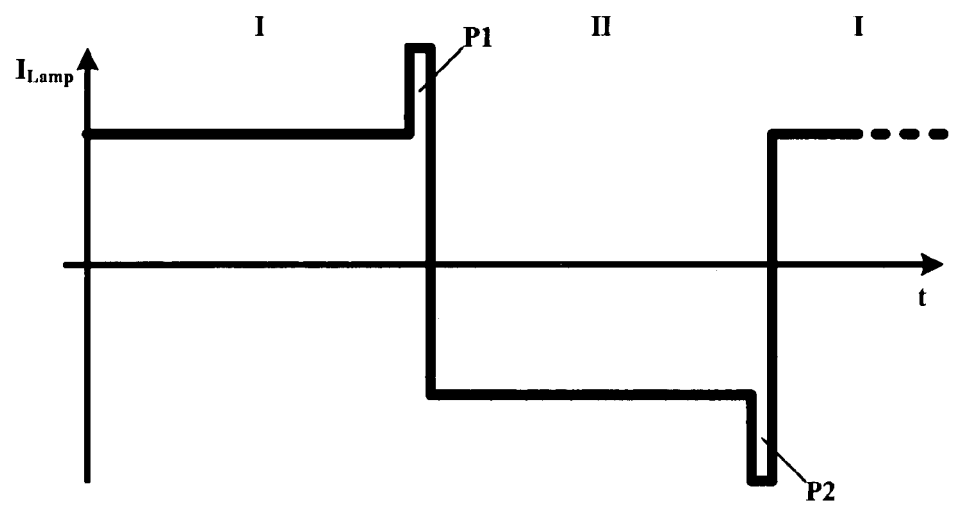
FIG. 3 shows an alternating block current with current pulses without a direct current component.

FIGS. 2 and 3 illustrate the course of alternating currents $I_{Lamp}$ supplied conventionally to a UHP lamp 11. FIG. 2 shows a standard block current. In this block current, each duty cycle has two half cycles I, II of the same length, during which a constant current of the same amplitude but opposed polarity is provided. The half cycle I with a positive current will also be referred to as positive half cycle, and the half cycle II with a negative current will also be referred to as negative half cycle. FIG. 3 shows a similar standard block current, in which an additional current pulse P1, P2 having the same polarity as the regular block current is added at the end of each half cycle I, II. The use of such a current comprising additional pulses is known for instance from document EP 0 766 906 A. As can be seen in FIGS. 2 and 3, the conventional alternating current does not have any direct current component. Such a conventional current is also supplied by the power supply 14 of FIG. 1 to the UHP lamp 11, in case the micro-controller 15 determines that the both electrodes 12, 13 are currently hot enough, or that both electrodes 12, 13 are too cold and that thus only the total average power has to be increased.

Different possibilities for adjusting the direct current component of the supplied alternating current to a desired value when proceeding from one of the conventionally supplied alternating currents illustrated in FIGS. 2 and 3 are illustrated in FIGS. 4 to 7.

Figure 4:
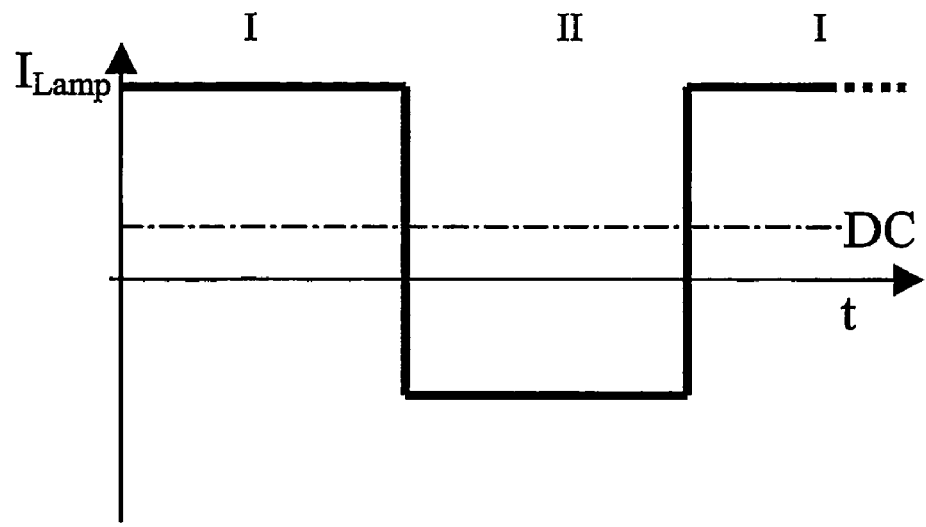
FIG. 4 shows an alternating block current with a superimposed direct current.

In the solution presented in FIG. 4, a desired direct current is simply superimposed to the provided alternating block current of FIG. 2. The additional direct current is provided by the power supply circuit 14 according to control signals by the micro-controller 15. In the depicted situation, a positive direct current is superimposed to the conventional alternating current. As a result, the alternating current $I_{Lamp}$ provided to the lamp comprises a positive direct current component DC corresponding to the superimposed direct current, as indicated in the figure. The same effect can be reached without additional means for superimposing a direct current, and thus without a change of the structure of the conventionally used power supply, by using a different current strength in both directions of the conventional alternating current.

Figure 5:
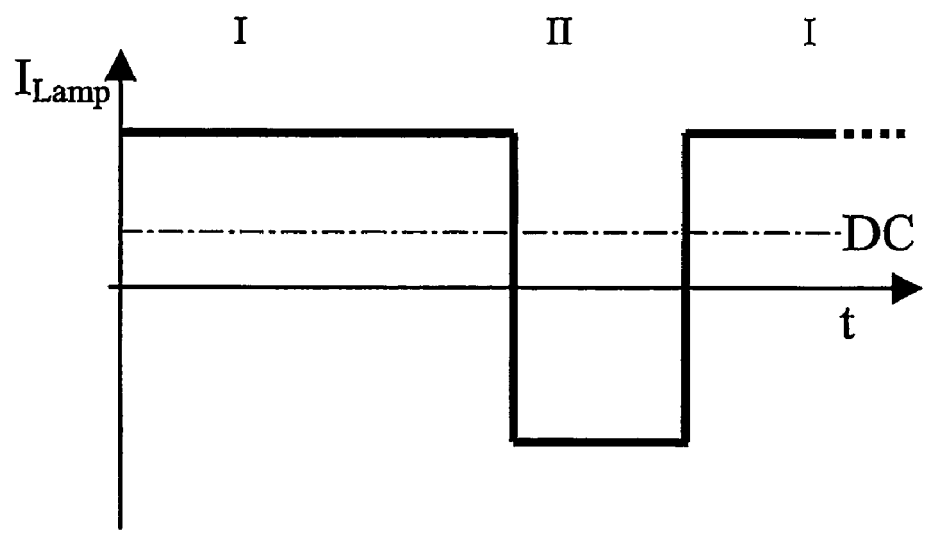
FIG. 5 shows an alternating block current with an asymmetrical duty cycle.

FIG. 5 proceeds equally from the standard alternating block current depicted in FIG. 2. In the solution presented in FIG. 5, a direct current component is achieved by increasing the length of the one of the half cycles of a duty cycle of the conventional alternating current and by reducing the length of the other one of the half cycles of the duty cycle. The length of the half cycles is set in the power supply circuit 14 according to control signals by the micro-controller 15. In the depicted situation, the respective positive half cycle I is longer than the respective negative half cycle II. As a result, the alternating current comprises the positive direct current component DC indicated in the figure.

Figure 6:
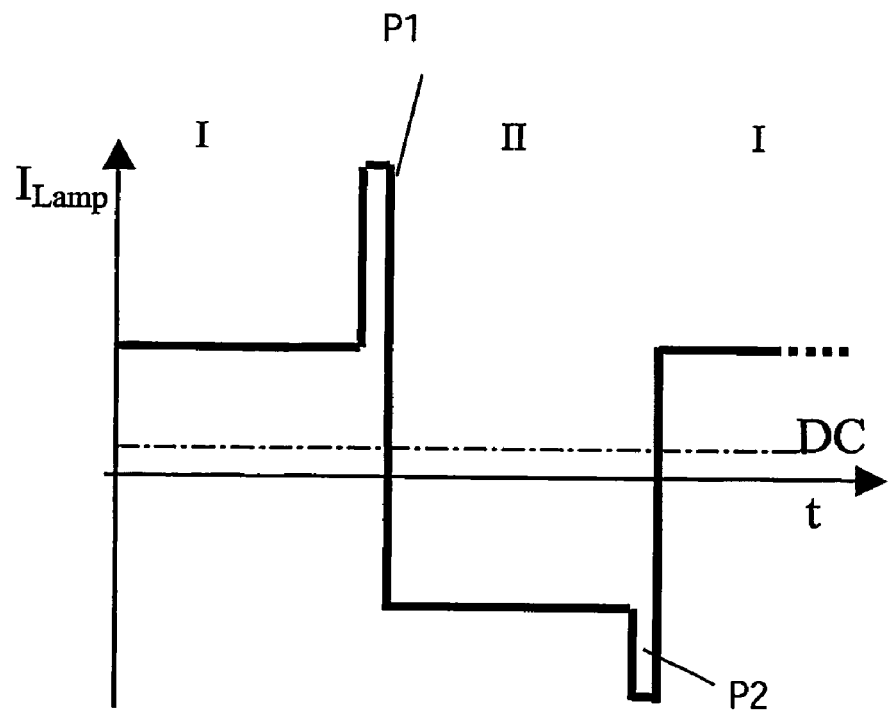
FIG. 6 shows an alternating block current with amplitude modulated current pulses.
Figure 7:
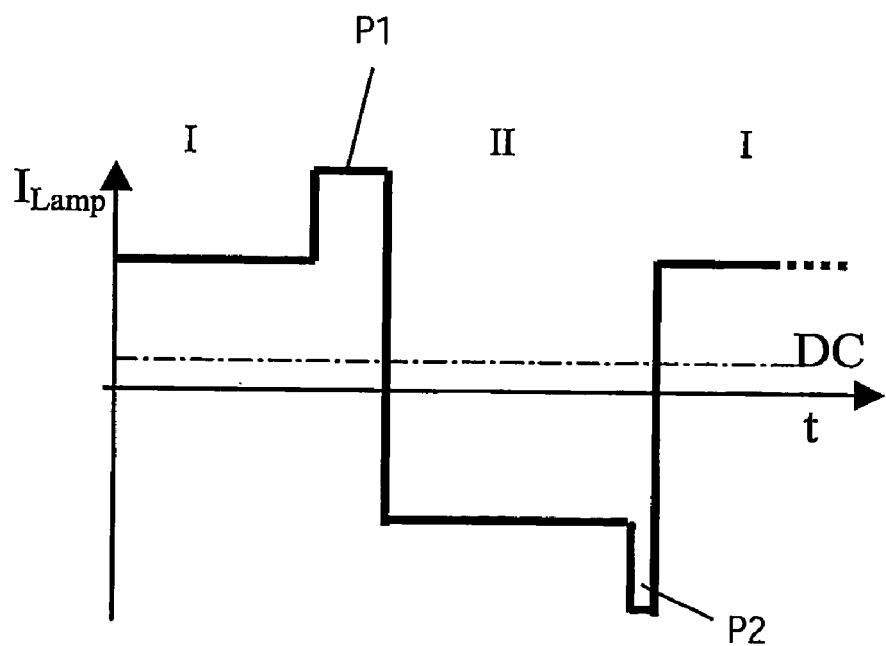
FIG. 7 shows an alternating block current with time modulated current pulses.

FIG. 6 proceeds from the standard alternating block current with additional current pulses depicted in FIG. 3. In the solution presented in FIG. 6, a direct current component is achieved by modulating the amplitude of the additional current pulses in each half cycle. The modulation of the amplitude of the additional current pulses is set in the power supply circuit 14 according to control signals by the micro-controller 15. In the depicted situation, the additional current pulse P1 in the positive half cycle I has a larger amplitude than the additional current pulse P2 in the negative half cycle II. As a result, the alternating current comprises the positive direct current component DC indicated in the figure.

FIG. 7 proceeds again from the standard alternating block current with additional current pulses depicted in FIG. 3. In the solution presented in FIG. 7, a direct current component is achieved by modulating the time of the additional current pulses in each half cycle. The modulation of the time of the additional current pulses is set in the power supply circuit 14 according to control signals by the micro-controller 15. In the depicted situation, the additional current pulse P1 in the positive half cycle I has a longer duration than the additional current pulse P2 in the negative half cycle II. As a result, the alternating current comprises the positive direct current component DC indicated in the figure.

It is to be noted that the presented embodiments of the invention constitute only selected embodiments which can be varied in many ways.

The invention claimed is:

1. Method for operating a discharge lamp (11) including two electrodes (12,13), said method comprising applying to said electrodes (12,13) an alternating current ($I_{Lamp}$), which alternating current ($I_{Lamp}$) has a direct current component (DC) for compensating a temperature difference between said two electrodes (12,13), wherein said direct current component (DC) is selected such that a first one of said electrodes (12,13), which is expected to have a lower temperature than the second one of said electrodes (13,12), functions as an anode for said direct current component (DC), while said second electrode (13,12) functions as a cathode for said direct current component (DC).

2. Method according to claim 1, wherein said direct current component (DC) constitutes 0.1% to 50% of the total current ($I_{Lamp}$).

3. Method according to claim 1, wherein said direct current component (DC) is obtained by superimposing a direct current to the alternating current ($I_{Lamp}$).

4. Method according to claim 1, wherein said direct current component (DC) is obtained by providing a different current strength in both directions of the alternating current ($I_{Lamp}$).

5. Method according to claim 1, wherein said direct current component (DC) is obtained by providing to said discharge lamp (11) the alternating current ($I_{Lamp}$) with a duty cycle of which the half cycles (I) with a positive current have a different length than the half cycles (II) with a negative current.

6. Method according to claim 1, wherein said direct current component (DC) is obtained by supplying one or more additional current pulses (P1,P2) to each half cycle (I,II) of a duty cycle of said alternating current ($I_{Lamp}$), and wherein the energy content of said additional current pulses (P1,P2) is controlled in a way that it is larger in one of said half cycles (I,II) than in the other.

7. Method according to claim 1, wherein said direct current component (DC) is determined according to an expected temperature difference between said electrodes (12,13) due to a non-horizontal burning position of said discharge lamp (11).

8. Method according to claim 1, wherein said direct current component (DC) is determined according to an expected temperature difference between said electrodes (12,13) due to an unequal cooling of said electrodes (12,13).

9. Method according to claim 1, wherein said direct current component (DC) is predetermined for an entire time of operation of said discharge lamp (11).

10. Method according to claims 1, wherein said direct current component (DC) is adjusted during the operation of said discharge lamp (11) based on measurements indicative of an expected temperature difference between said electrodes (12,13).

11. Method according to claim 10, wherein for said measurements, the voltage over said discharge lamp (11) is measured at least twice during a respective half cycle (I,II) of the duty cycle of the alternating current ($I_{Lamp}$) supplied to said discharge lamp (11), and wherein a detected increasing voltage during one half cycle (I,II) is taken as indication that the electrode (12,13) acting as the cathode in this half cycle (I,II) is hot enough, while at least one of a decreasing voltage and a sudden drop of voltage during one half cycle (I,II) is taken as indication that the electrode (12,13) acting as the cathode in this half cycle (I,II) is too cold.

12. Method according to claim 10, wherein said direct current component (DC) is adjusted during the operation of said discharge lamp (11) in a control loop, in which control loop the value of said direct current component (DC) is respectively adapted to provide more anodic current to an electrode (12,13) which was determined to be too cold and to have the lower temperature than said other electrode (13,12).

13. Method according to claim 10, wherein said direct current component (DC) is adjusted during the operation of said discharge lamp (11) in a control loop, in which control loop the value of said direct current component (DC) is decreased in case both of said electrodes (12,13) were determined to be hot enough.

14. Method according to claim 10, wherein the total power provided to said discharge lamp (11) is increased in case both of said electrodes (12,13) are determined to be too cold.

15. Method according to claim 10, wherein the total power provided to said discharge lamp (11) is decreased, in case both of said electrodes (12,13) are determined to be hot enough.

16. Method according to claim 10, wherein information on the carried out adjustments of the direct current component (DC) is recorded in a non-volatile memory for supporting future adjustments of the direct current component (DC).

17. Electronic circuit (14,15,16) for operating a discharge lamp (11) with two electrodes (12,13), which electronic circuit (14,15,16) comprises means for realizing the method according to one of claims 1 to 16.

18. Software program for operating a discharge lamp (11) with two electrodes (12,13), which software program comprises a software code realizing the method according to one of claims 1 to 16 when run in processing means (15) of a driver (14,15,16) controlling the power supply to said discharge lamp (11).

19. Lighting system comprising a discharge lamp (11) with two electrodes (12,13) and means for realizing the method according to one of claims 1 to 16.

20. Lighting system according to claim 19, which enables different burning positions for said discharge lamp (11).

21. Lighting system according to claim 19, in which system said discharge lamp (11) is arranged such that one of said electrodes (12,13) is cooled more than the other one of said electrodes (12,13) during the operation of said lighting system.

22. Lighting system according to claim 19, which system is a projection system.

* * * * *